Oct. 16, 1923.
S. E. DINGWELL
1,471,248
AUTOMOBILE TIRE CHAIN
Filed May 20, 1922
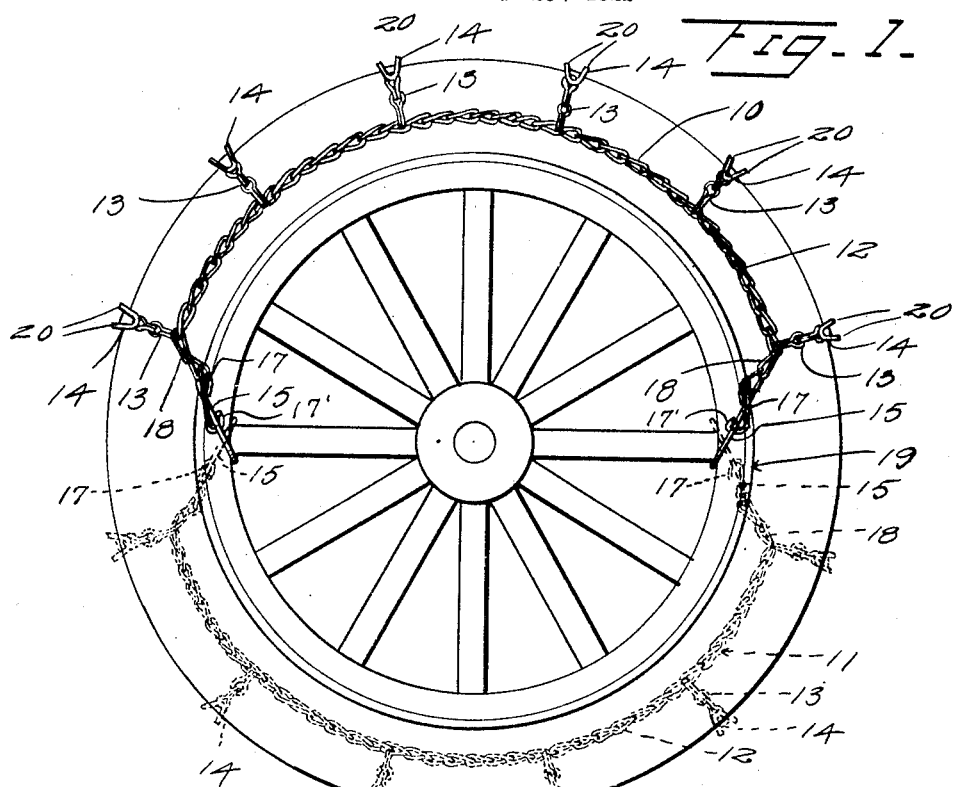
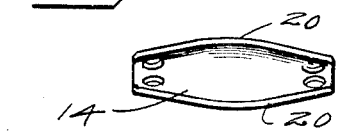
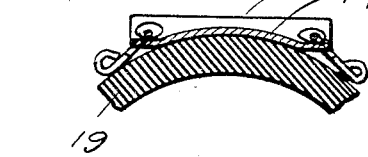
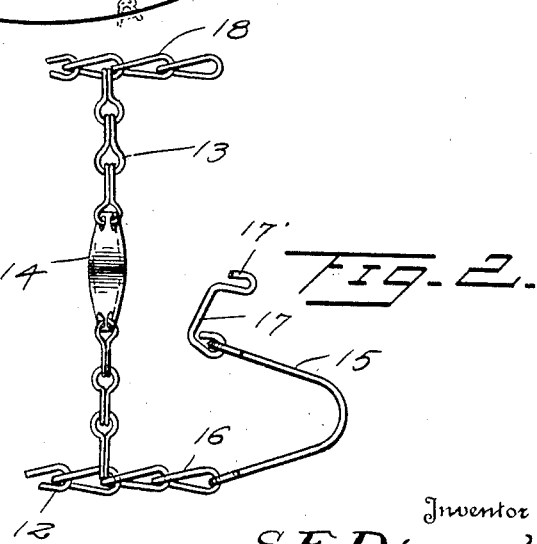
Inventor
S. E. Dingwell
By
Attorney Patented Oct. 16, 1923.

1,471,248

UNITED STATES PATENT OFFICE.

SAMUEL E. DINGWELL, OF VIOLET, NEBRASKA.

AUTOMOBILE TIRE CHAIN.

Application filed May 20, 1922. Serial No. 562,394.

*To all whom it may concern:*

Be it known that I, SAMUEL E. DINGWELL, a citizen of the United States, residing at Violet, in the county of Pawnee and State of Nebraska, have invented certain new and useful Improvements in an Automobile Tire Chain; and I do hereby declare the following to be a full, clear, and exact description of the invention, such as will enable others skilled in the art to which it appertains to make and use the same.

The object of the invention is to provide a simple, inexpensive and efficient tire chain for automobiles and similar vehicle wheels whereby application of the chain is facilitated to the extent that it may be attached without the use of jacks or without jacking up the wheels or without backing or advancing the car so as to carry the wheel over the chain, after laying the chain upon the ground as in the ordinary practice; and furthermore to provide an improved form of cleat or road engaging element whereby the tractive effect of the chain is increased; and with these objects in view the invention consists in a construction and combination of parts of which a preferred embodiment is shown in the drawing; wherein Figure 1 is a side view of a chain embodying the invention applied in the operative position to a wheel tire, one member of the chain being shown in full lines at the top of the wheel and the other portion in dotted lines extending under the lower side of the wheel.

Figure 2 is a detail plan view of one end of a chain section or member.

Figure 3 is a detail view of one of the cleats.

Figure 4 is a sectional view of one of the cleats showing the position thereof on the tire.

The chain consists of a plurality of sections 10 and 11 comprising the side retaining chains 12 connected by the transverse tread spanning chains 13 in which are disposed the cleats 14. At each end of a chain member or section is arranged a felly engaging hook 15 loosely connected as by an attaching chain 16 to one of the retaining chains or formed as a continuation of one of the side retaining chains, and provided at its free end with a terminal hook 17 for engaging the link of an opposite retaining chain 18, so that the attachment of the section or member covering substantially one half of the circumference of the wheel which is indicated at 19 is accomplished by extending the retaining hooks around the tire and over the inner surface of the felly of the wheel adjacent to one of the wheel spokes and engaging the terminal hooks thereof with the proper link of the opposite securing chain.

As shown in Figure 1 the hook 17 passes through the end link of the retaining chain 18 and is doubled back and has its hook terminal 17' engaged with the felly hook 15. The hook 17 when passed through the link 18 and doubled back and engaged with the felly engaging hook 15 has the effect of securely fastening the felly hook in place and has a further effect of tightening the chain 12.

After having applied one section or member of the chain to the upper portion of a wheel or that portion which is not in contact with the ground, the car may be advanced or backed to expose the other side of the wheel and thus permit of the application of the other section or member.

Under ordinary circumstances if it is desired to use the chain as a means of advancing the car out of a muddy rut or depression in the road the application of a single chain section or member will be found sufficient and as above indicated this chain section or member may be applied to that portion of the wheel which is uppermost and which therefore can be done with facility notwithstanding the fact that the bearing portion of the wheel is located in the rut or depression. The chain member or section which is attached to the wheel is prevented from creeping or sliding thereon by reason of engagement with the spokes.

The cleats 14 which are used in connection with the tread elements of the chain are elongated transversely of the wheel tread or in a direction transversely of the length of the tire chain and are cross sectionally bowed or arched to present outwardly projecting road engaging edges 20 which are thus disposed transversely to the path of movement of the wheel and enable the wheel to obtain a firm grip on the road surface. The arched inner side of the cleat forms a smooth bearing for the surface of the tire to avoid chafing or cutting the same.

Having thus described the invention, what I claim is:—

A tire chain consisting of separate sections or members each of a length adapted to embrace a portion of the circumference of a wheel and provided with terminal securing means for engaging the wheel felly and spokes, each of said terminals securing means consisting of a felly hook connected with the free end of one of the side chains of the device, said hook having pivotal connection at its free end with a link, said link having its free end laterally offset and bent to provide a terminal hook, said link adapted to be passed through a link of the side chain at the opposite side of the device and to be doubled back and have its laterally offset terminal hook engaged with the felly engaging hook whereby to securely fasten the felly hook in place.

In testimony whereof I affix my signature in presence of two witnesses.

SAMUEL E. DINGWELL.

Witnesses:
A. R. LOCH,
ARTHUR M. DAVIS.